(12) United States Patent
Doepker

(10) Patent No.: US 7,553,118 B1
(45) Date of Patent: Jun. 30, 2009

(54) DIVERTER AND METHOD FOR MOVING BODIES BETWEEN LEVELS OF AN ASSEMBLY LINE OR OTHER STRUCTURE

(75) Inventor: Brian T. Doepker, Kalida, OH (US)

(73) Assignee: The Schnipke Family LLC, Ottoville, OH (US)

( * ) Notice: Subject to any disclaimer, the term of this patent is extended or adjusted under 35 U.S.C. 154(b) by 0 days.

(21) Appl. No.: 12/116,992

(22) Filed: May 8, 2008

(51) Int. Cl.
*B65G 1/08* (2006.01)

(52) U.S. Cl. .................. 414/276; 414/278; 414/283; 198/347.2; 198/463.3; 198/578; 198/592

(58) Field of Classification Search ............ 198/347.2, 198/407, 412, 463.3, 528, 529, 539, 578, 198/592; 414/276, 278, 283; 193/15, 17, 193/2 A
See application file for complete search history.

(56) References Cited

U.S. PATENT DOCUMENTS

| | | | | |
|---|---|---|---|---|
| 342,433 | A * | 5/1886 | Fischer | 193/27 |
| 3,093,229 | A * | 6/1963 | Scheidenhelm | 193/36 |
| 3,392,813 | A * | 7/1968 | Trautmann | 193/36 |
| 4,432,686 | A * | 2/1984 | Feldkamper | 414/793.5 |
| 4,485,910 | A * | 12/1984 | Tabler | 193/36 |
| 5,111,963 | A * | 5/1992 | Grace, Sr. | 221/75 |
| 5,617,961 | A * | 4/1997 | Konstant et al. | 211/151 |
| 6,186,725 | B1 * | 2/2001 | Konstant | 414/276 |
| 6,471,461 | B2 * | 10/2002 | Muilwyk | 414/276 |
| 6,557,724 | B1 * | 5/2003 | LeCroy et al. | 221/76 |
| 6,588,608 | B2 * | 7/2003 | Pater | 211/151 |
| 6,990,796 | B2 | 1/2006 | Schnipke et al. | |

* cited by examiner

*Primary Examiner*—Douglas A Hess
(74) *Attorney, Agent, or Firm*—Jason H. Foster; Kremblas, Foster, Phillips & Pollick

(57) ABSTRACT

A method and apparatus for moving loaded pallets from one location to another, such as from a region of an assembly line to a vertically lower region of the same assembly line. A first conveyor track is angled downwardly from a source of loaded pallets toward a diverter, which is driven to pivot about one end. The diverter receives the pallet when the diverter is parallel to the first conveyor track and then pivots to a horizontal orientation at which it is unloaded. Upon the last object on the pallet being removed, the diverter pivots downwardly to become parallel to a second conveyor track that is angled downwardly from the diverter, and is released to slide down the second conveyor track. The pallet is preferably precisely located and clamped in the diverter.

11 Claims, 12 Drawing Sheets

DIVERTER AND METHOD FOR MOVING BODIES BETWEEN LEVELS OF AN ASSEMBLY LINE OR OTHER STRUCTURE

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to methods of moving bodies, such as pallets containing components, and more specifically relates to a method of moving such pallets vertically from one level to another.

2. Description of the Related Art

It is well known in the manufacturing industry to place component parts on pallets that rest upon a conveyor and are transported thereby, as shown in U.S. Pat. No. 6,990,796 to Schnipke, et al., which is incorporated herein by reference. Such pallets can contain component parts to which other components are added. Similarly, such pallets can contain component parts that are removed from the pallet and used in an assembly process.

The pallets referred to above can be transported along an assembly line in a manufacturing facility by resting the downwardly facing surface of each pallet upon the upwardly facing surface of a conveyor belt. Such a belt is capable of transporting pallets long distances along a horizontal path, but cannot readily move pallets significant vertical distances in a small space. Such vertical movement normally must be made by short runs of steeply angled tracks, which are prone to slipping due to the materials of which the tracks and pallets are made.

It is known to provide an angled track to allow a pallet to fall vertically under the force of gravity from one level to another. However, if there are component parts on the falling pallet that must be removed during the transition from one level to the other, removal of the object from the pallet during the transition presents a problem of timing due to the relative motion. Even if the pallet is not in motion during removal of the object and the object is removed by a high precision robot, the problem of precisely locating the pallet during removal so that the position of the object thereon is known exactly still exists.

Therefore, the need exists for a method of moving pallets vertically from one level to another while permitting removal of objects from the pallets.

BRIEF SUMMARY OF THE INVENTION

A method of moving a pallet with at least one object disposed thereon from a first level to a second level is disclosed herein. The method comprises the step of conveying the pallet with the object disposed thereon toward a diverter, which is mounted to move through more than one angle relative to horizontal. The pallet is conveyed onto the diverter while the diverter is disposed at a first angle relative to horizontal, and the diverter is moved from the first angle to a second angle relative to horizontal that is different from the first angle. The pallet is moved with the diverter. The diverter is held stationary at the second angle while the object is removed from the pallet. The removal process can take a fraction of a second, many seconds, or many minutes or more. The diverter is moved from the second angle to a third angle relative to horizontal that is different from the second angle, and the pallet is moved with the diverter. The pallet is conveyed away from the diverter while the diverter is disposed at the third angle.

In a preferred embodiment, the step of releasably fixing the pallet to the diverter is performed, and this step more preferably comprises clamping the pallet. It is also preferred to release the pallet from the diverter.

In a preferred embodiment of the invention, the method of moving is from a first level vertically to a second level, and comprises conveying the pallet with the object disposed thereon along a first conveyor track from an upper conveyor track end toward a diverter disposed adjacent a lower conveyor track end. The conveyor track conveys the pallet by gravity toward the diverter. The pallet is conveyed onto the diverter while the diverter is disposed substantially parallel to the first conveyor track. The pallet is releasably fixed to the diverter. The diverter is pivoted to a substantially horizontal orientation, thereby moving the fixed pallet to a substantially horizontal orientation. The diverter is held stationary at the substantially horizontal orientation while the object is removed from the pallet.

The diverter is then pivoted from the substantially horizontal orientation to substantially parallel to a second conveyor track, preferably once the object is completely removed from the pallet. If there are multiple objects, it is preferred that all objects be removed prior to pivoting the diverter to the second conveyor track. The second conveyor track has an upper conveyor track end adjacent the diverter and a lower conveyor track end spaced from the diverter. The fixed pallet moves with the diverter, but is released from the diverter so the pallet can be conveyed onto the second conveyor track while the diverter is substantially parallel to the second conveyor track.

In a more preferred embodiment, the pallet is stopped along the first conveyor track held in place prior to being conveyed onto the diverter. The pallet is preferably driven onto the diverter to control the speed and location of the pallet during transition from the conveyor track to the diverter. Once on the diverter, the pallet is preferably positively located thereon, such as by a boss with V-shaped protrusions being driven into a receptively-shaped void on the pallet.

The preferred embodiment of the present invention thus provides a simple and reliable means and method for moving pallets loaded with component parts from one location to a different location. The preferred movement is vertically downwardly, but vertically upwardly is not excluded, nor is movement horizontally. By permitting the diverter to dwell in a horizontal orientation, the unloading, which is preferably by robotic arm, can more feasibly be performed rapidly and with precision in the location of the objects.

Figure 1:
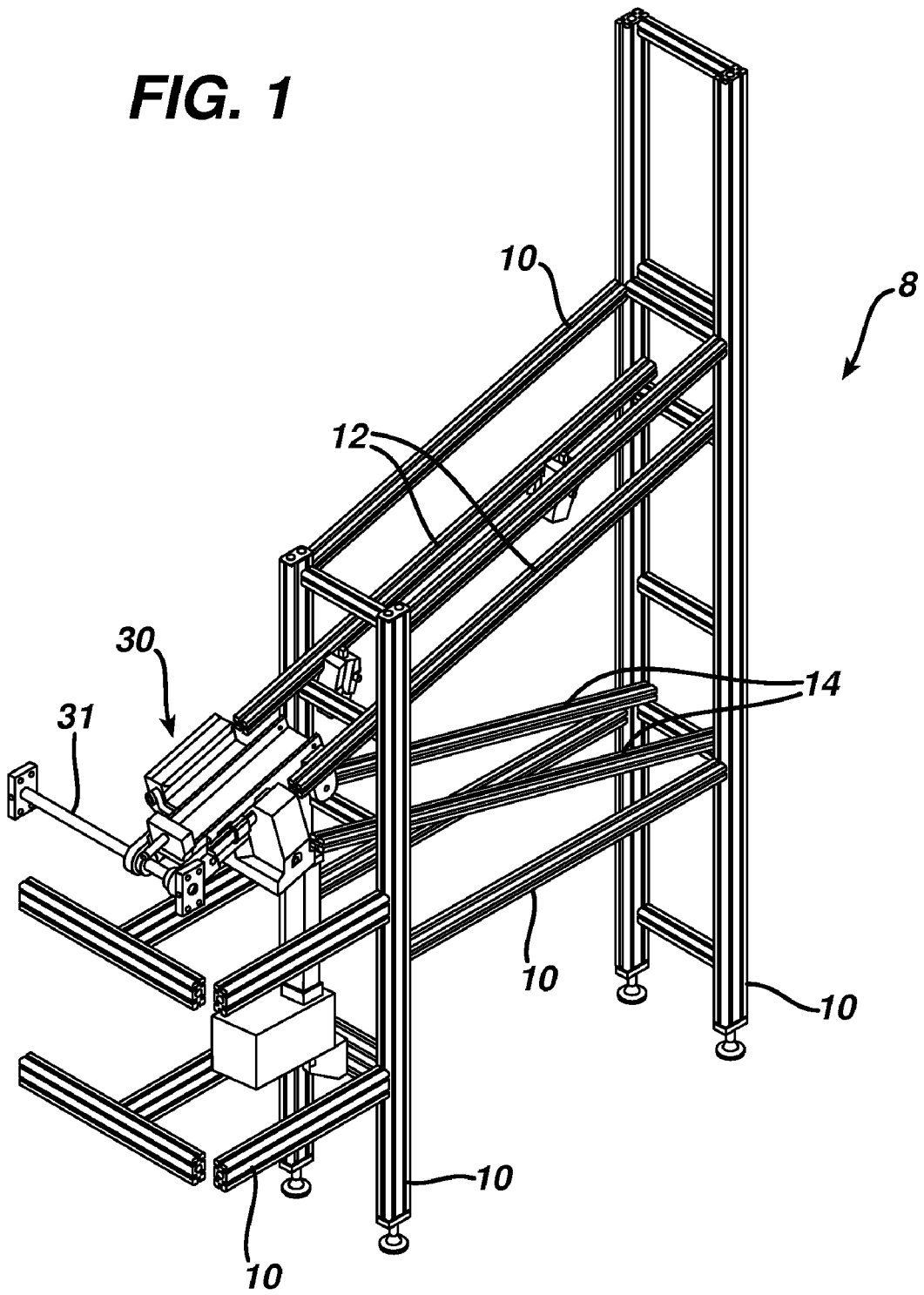
FIG. 1 is a view in perspective illustrating a preferred apparatus for use with the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

The diverter apparatus 8 illustrated in FIG. 1 has a plurality of frame members 10 that are attached to other frame members 10 at joints to form a support frame of the diverter apparatus 8. The support frame is a rigid body, preferably made of extruded aluminum bars that are attached to one another by conventional means, such as clamps, screws or specialized brackets that permit attachment to other similar members. The vertical frame members 10 shown in FIG. 2 have feet that rest upon the floor, such as the floor of a factory or other facility. The feet 11 preferably thread into and out of the frame members 10 to adjust the position of the frame members 10 relative to the floor in order to level the diverter apparatus 8, as is conventional.

Figure 2:
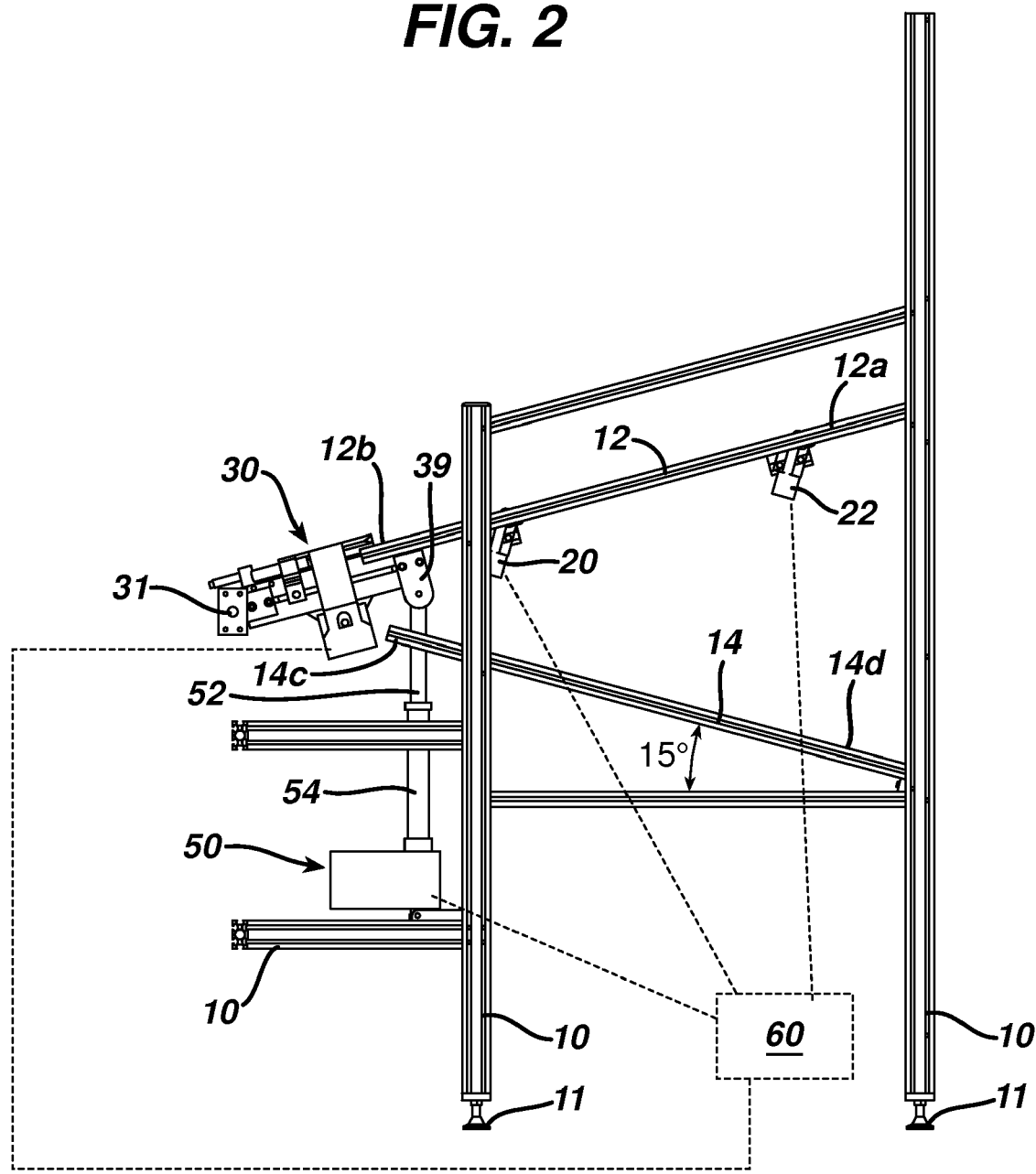
FIG. 2 is a side view illustrating the apparatus of FIG. 1.

The conveyor tracks 12 and 14 are rigidly mounted to the frame members 10 at predetermined angles, such as 15° from horizontal, as shown in FIG. 2. Of course, angles that vary slightly or significantly from the example listed herein are contemplated, and can be substituted for the angle described. It is also contemplated that conveyors of other types than the gravity-fed tracks 12 and 14 can be mounted to the frame members 10, including without limitation, driven conveyor belts. Terms such as "front," "rear," "top," "bottom," "horizontally," "vertically," "laterally," and "longitudinally" are used herein to describe the relative position and orientation of various components of the invention, all with respect to the geometry and orientation of the apparatus 8 in an operable orientation, which is shown in FIG. 2. This terminology includes the words specifically mentioned, derivatives thereof, and words of similar import, as understood by a person having ordinary skill in the art.

The track 12 extends from a higher end 12a that is positioned at the rear of the apparatus 8 downwardly to a lower end 12b that is positioned at the front of the diverter apparatus 8. Similarly, the track 14 extends from a higher end 14c that is positioned at the front of the apparatus 8 downwardly to a lower end 14d that is positioned at a rear of the diverter apparatus 8. Conventional component part carrying pallets rest upon the tracks 12 and 14, and can slide easily relative thereto due to the low friction between the interfacing surfaces of the respective parts. The tracks 12 and 14 provide two downwardly inclined legs of a path through which pallets travel to be displaced from the higher end 12a of the track 12 to the lower end 14d of the track 14. In this manner, the tracks 12 and 14 define the path of travel of pallets from a first position to a vertically different, and, in the example of FIG. 1, lower position.

In the preferred embodiment, the higher end 12a of the track 12 is aligned with a driven conveyor belt, similar gravity-fed conveyor track, chute or other transporting mechanism by which pallets can be moved. In a most preferred embodiment, a person manually loads component parts on each pallet and then places each pallet on a conveyor belt, and the conveyor belt drives each pallet toward the higher end 12a of the track 12, which receives pallets when there is space on the track 12. In this manner, the loaded pallets are driven to the track 12, which conveys pallets toward the diverter 30 as described in more detail below.

Lower and higher stopping mechanisms 20 and 22, respectively, are mounted to the track 12 at spaced positions thereon. The mechanisms 20 and 22 are preferably solenoids, but can be pneumatic rams, linear electric motors or other electrically, pneumatically or otherwise driven devices. The stopping mechanisms 20 and 22 displace a rigid body into and out of the path of travel of pallets on the track 12, in order to stop a pallet or permit a pallet to pass thereby, respectively. The mechanisms 20 and 22 are connected to a central computer 60 via wires (shown in phantom in FIG. 2) in order for the computer 60 to actuate the mechanisms 20 and 22 in accordance with its programmed logic. It is contemplated that substitute connections, such as pneumatic lines, wireless devices, and other similar connections from the computer 60 to the actuated structures can be substituted for the wires, as will be understood by a person having ordinary skill in the art.

In a preferred embodiment, pallets enter the track 12 at the higher end 12a and are stopped at the higher stopping mechanism 22. Pallets back up from the higher stopping mechanism 22 to the conveyor belt (not shown) that feeds the diverter apparatus 8, where the earliest loaded pallet in a line of backed up pallets is at the higher stopping mechanism 22 and the latest loaded pallet is located at the end of that line. Upon receiving a signal from the computer 60, the higher stopping mechanism 22 retracts its rigid body from blocking the path of a pallet, and the pallet slides under the force of gravity down the track 12. The rigid body of the higher stopping mechanism 22 immediately extends to block the next pallet from sliding down the track 12 past the higher stopping mechanism 22.

The rigid body of the lower stopping mechanism 20 is extended into the path, thereby stopping the pallet that was just released from the higher stopping mechanism 22 at the lower stopping mechanism 20. Upon receiving a signal from the computer 60, the lower stopping mechanism 20 retracts its rigid body from blocking the path of the pallet, and the pallet slides under the force of gravity down the track 12 toward the diverter 30. The rigid body of the lower stopping mechanism 20 immediately extends to block the next pallet released by the higher stopping mechanism 22 from sliding down the track 12. The lower stopping mechanism 20 preferably holds back only one pallet at a time, and thus the lower stopping mechanism 20 serves as the "gatekeeper" to the diverter 30 located at the lower end 12b of the track 12.

The diverter 30 receives pallets from the track 12 when it is oriented as shown in FIG. 2, in what can be referred to as a "receiving" orientation. The diverter 30 can be moved, as described in detail below, so that it is oriented differently than as shown in FIG. 2. When the diverter is oriented differently than as shown in FIG. 2, the diverter 30 should not receive a pallet from the track 12. It is preferred for the central computer 60 to be programmed to ensure that this situation never arises. The central computer 60 is programmed to prevent a pallet from being released from the lower stopping mechanism 20 when the diverter 30 is not in a receiving orientation.

Figure 3:
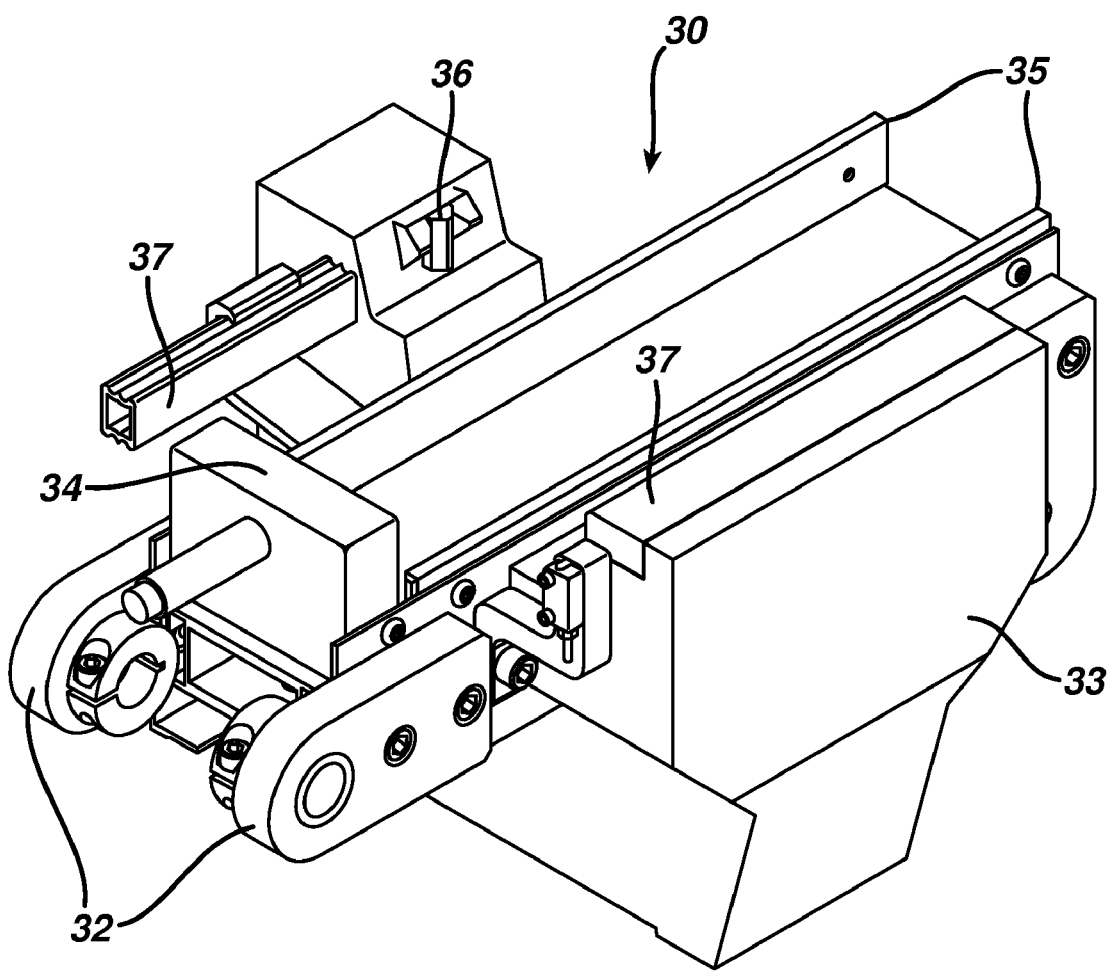
FIG. 3 is an enlarged view in perspective illustrating the diverter of the apparatus of FIG. 1.

The diverter 30 is moved about the following structure, although any other mechanism that accomplishes movement of the diverter 30 between three distinct orientations, described below, can be substituted for the structure disclosed herein. The diverter 30, shown in more detail in FIG. 3, has legs 32 with conventional rotary bearings to receive the pivot rod 31 (FIGS. 1 and 2), which is mounted to a frame member (not shown) or other stable structure. The legs 32 extend from a rigid platform 33 that is the base of the diverter 30. Any pivoting structure that accomplishes the preferred pivoting movement, or any other structure that provides movement between three orientations, is considered within the bounds of the invention.

Two parallel slide rails 35 are mounted to the upper surface of the platform 33, and the upper edges thereof define a floor upon which the pallets slide during use. The pallets also slide between two parallel, spaced guide rails 37 that define a channel substantially as wide as the pallets and position the lateral edges thereof. During operation, the base of each pallet is conveyed into and out of the channel between the guide rails 37 and upon the slide rails 35. At a point during this transition when the pallet is at the farthest extent of the channel, the most downstream end of the pallet rests against the stop 34, which is located at one extreme end of the channel.

The diverter 30 has a boss 36 with a substantially horizontally oriented, V-shaped protrusion and a substantially vertically oriented, V-shaped protrusion that matingly register with receptively-shaped voids formed in the side of each pallet. The boss 36 is movable laterally toward and away from the guide rail 37 on the opposite side of the diverter 30 by a linear prime mover, such as a pneumatic ram (not visible) housed in the platform 33 and connected to the central computer 60. The ram displaces the boss 36 toward the opposite guide rail 37 in order to both locate the pallet in a known position by forcing the V-shaped protrusions into the voids in the pallet, and to releasably fix the pallet to the diverter 30. This is accomplished by clamping the pallet between the boss 36 and the opposite guide rail 37 to hold the pallet in the precise position that is a part of the program of the central computer 60. Because the protrusions are V-shaped, they cause the pallet to move horizontally and vertically, as needed to accommodate the boss 36, so that the tips of the V-shaped protrusions can penetrate to the deepest regions of the voids, thereby positively locating the pallet in the diverter 30. Because of this positive location of the pallet, the precise location of the component parts on the upper surface of the pallet is known, and, therefore, a robotic arm that is preprogrammed to lift and remove parts from an exact location is able to do so with the parts on the pallet.

The diverter 30 is driven in pivoting motion about the rod 31 by an electric jack 50 (see FIG. 2) that is connected to the central computer 60. The base of the jack 50 is pivotably mounted at its lower end to the frame member 10, and has an extensible rod 52 that extends from and retracts into a cylinder 54 in a conventional manner, such as by having a threaded bore into which a threaded shaft, which is driven by an electric motor, is inserted. The moveable rod 52 is pivotably mounted to the arms 39 at the end of the diverter 30 spaced from the pivot arm 31. When the rod 52 is driven upwardly, the diverter 30 is pivoted upwardly (counterclockwise in FIG. 2) about the rod 31. Conversely, when the rod 52 is driven downwardly (clockwise in FIG. 2), the diverter 30 pivots downwardly. The electric motor driven jack 50 can be replaced by one of many other conventional prime movers, including without limitation, a stepper or servo motor, indexing unit, or a pneumatic or hydraulic ram. The important feature of the jack 50 is that it drives the diverter 30 between three orientations (preferably the "receiving", "horizontal" and "giving" orientations), and preferably can stop at any point in between.

The "horizontal" orientation is achieved by the jack 50 driving the diverter as described above until the portion of the pallet that is held in the diverter 30 is substantially horizontal (level). This orientation can also occur when the surface of the diverter 30 upon which the pallet rests is substantially horizontal. The horizontal orientation is preferably the orientation at which objects, such as component parts disposed on the pallet, are removed, such as by a robot, and it is desired because robots tend to be more readily programmed to execute removal actions on horizontal surfaces. The jack 50 drives the diverter 30 to this orientation, and the horizontal orientation is maintained while the objects are removed from the pallet on the diverter 30. The horizontal orientation is maintained by programming the central computer 60 to actuate the jack 50 accordingly.

The "giving" orientation of the diverter 30 is achieved by the jack 50 driving the diverter 30 as described above until the diverter 30 is substantially coplanar with the track 14, thereby enabling the pallet on the diverter 30 to be released by the boss 36 to slide under the force of gravity onto and down the track 14. Thus, by loading pallets onto the track 12, the central computer 60 controls the higher and lower stopping mechanisms 22 and 20 to release pallets to slide under the force of gravity onto the diverter 30. The diverter then changes from a receiving orientation to a horizontal orientation, at which point a robotic arm unloads the objects from the pallet. This can take a small amount of time, such as fraction of a minute to over a minute, and once the objects are unloaded, as sensed by a load cell (detecting weight) or another sensor, the central computer 60 actuates the jack 50 to pivot the diverter 30 to the giving orientation. At this orientation, once the boss 36 releases the pallet the pallet slides under the force of gravity onto and down the track 14. Once the pallet clears the end of the diverter 30, the central computer 60 actuates the jack 50 to drive the diverter back to the receiving position to receive the next pallet held by the lower stopping mechanism 20.

In the preferred embodiment of the invention, the tracks 12 and 14 convey pallets to the diverter by permitting the pallets to slide under the force of gravity. In an alternative embodiment, each of the tracks 12 and 14 is replaced by an driven conveyor belt apparatus, as is conventional in manufacturing facilities. Each conveyor belt is aligned along the frame members 10 in the same configuration as the tracks 12 and 14, and is driven in a conventional manner to convey the pallets into and out of the diverter. In another contemplated alternative, the conveyor belts are horizontally oriented and separated from one another by a vertical gap. The diverter receives pallets from the first conveyor belt at one diverter orientation, pivots to a second orientation at which the objects are unloaded, and then the diverter is pivoted to another orientation at which the pallet is conveyed onto the second conveyor belt. In this alternative, the diverter is unloaded when it is at an orientation that is angled significantly relative to horizontal, but this is possible with existing robots that are oriented at the same angle as the diverter during unloading, or may be feasible with robots that are improved over existing robots. Other alternative conveyor structures to the preferred tracks 12 and 14 are contemplated, as will be understood by the person of ordinary skill from the description of the preferred embodiment. For example, an alternative is contemplated in which two conveyors convey pallets from a lower conveyor to a higher conveyor, and not the opposite as in the alternatives described above. Other alternatives will become apparent to a person having ordinary skill.

Figure 4:
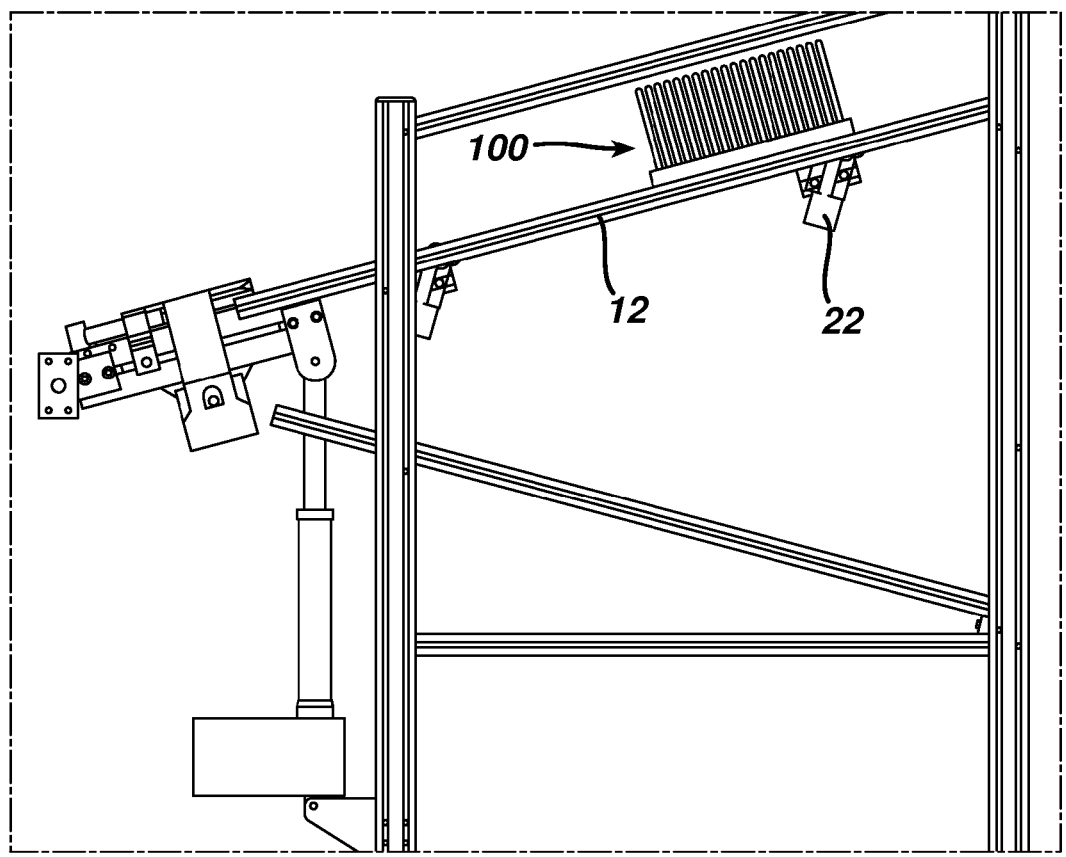
FIG. 4 is a side view illustrating the apparatus of FIG. 1 during a first step of a preferred process.

The diverter apparatus 8 operates in the following manner as shown sequentially in FIGS. 4 through 12. One or more pallets are lined up behind the first pallet resting against the higher stopping mechanism 22, and then a single pallet is released to fall to the lower stopping mechanism 20 by the central computer 60 actuating the higher stopping mechanism 22, as shown in FIG. 4. The pallet 100 released by the higher stopping mechanism 22 slides downwardly from the upper end 12a of the track 12 along the path of travel under the force of gravity toward the lower stopping mechanism 20. The track 12 preferably has a smooth upper surface that the pallet rests upon, and the pallet 100 preferably has an extremely low friction surface (such as acetal resin sold under the trademark DELRIN) facing the track. The vertical component of the angled track 12 in combination with the small friction forces resisting relative motion between the abutting faces of the pallet and the track thus permit the pallet to slide downwardly toward the diverter 30, as is shown in FIG. 4.

Figure 5:
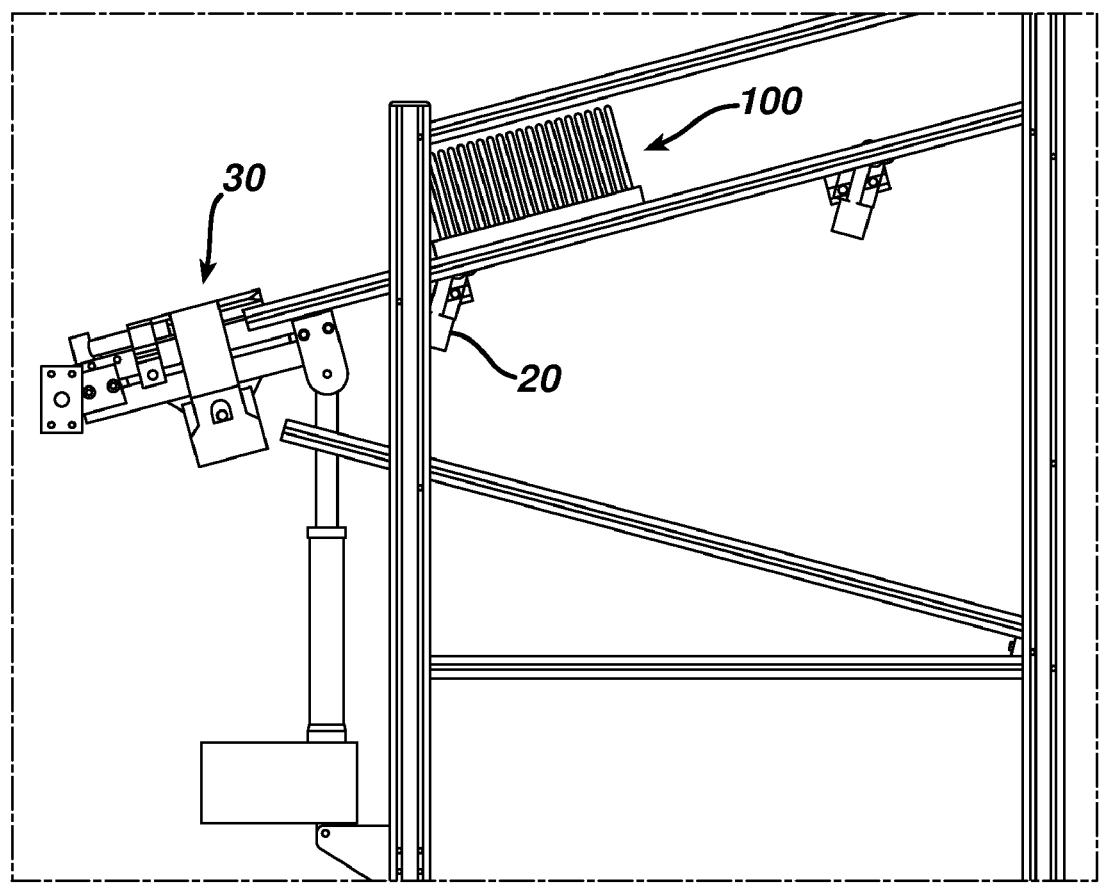
FIG. 5 is a side view illustrating the apparatus of FIG. 1 during a later step of a preferred process.

The pallet 100 progresses downwardly toward the diverter 30, but it is prevented from entering the diverter 30 by the lower stopping mechanism 20 as shown in FIG. 5. The pallet 100 is held in the position shown in FIG. 5 until the lower stopping mechanism 20 is actuated by the central computer 60 to release the pallet 100. Actuation of the lower stopping mechanism 20 to release the pallet 100 is for a brief time so that only a single pallet is released to slide further toward the diverter 30. Preferably a sensor detects the position of the next pallet and signals the central computer 60 to actuate the lower stopping mechanism 20 to raise its rigid body to obstruct passage of the next pallet.

In a preferred method, the pallet 100 is held by the lower stopping mechanism 20 the entire time the diverter 30 is in transition between the "receiving" orientation shown in FIG. 5 and any other orientation (as described in detail below). Before the pallet 100 is released by the lower stopping mechanism 20, a conventional sensor (not shown) preferably detects that the diverter 30 is in the receiving orientation. Such a sensor can be a position sensor mounted at the lower track end 12b and configured to detect the end of the diverter 30. The sensor signals the central computer 60 as to the orientation of the diverter 30, which prevents release of the pallet 100 by the lower stopping mechanism 20 at any time the diverter 30 is not in a condition to receive the pallet. Of course, it is possible to release a pallet as the diverter 30 is moving toward the receiving orientation, so that during the delay from the pallet being released to the pallet arriving at the diverter 30, the diverter 30 arrives at the receiving orientation. Such modifications will become apparent from the description herein.

In the receiving orientation, the portion of the diverter's channel that receives the lower face of the pallet 100 is preferably aligned along a plane that is parallel to a plane that contains the conveyor track 12. Most preferably, these two planes are substantially coplanar, providing a smooth transition and preventing substantial freefall or other condition that might cause an abrupt change in the path of travel of the pallet during the transfer between the track 12 and the diverter 30. Such an abrupt change in the path of travel can cause the component parts held by the pallet 100 to shift or fall off.

Once the lower stopping mechanism 20 releases the pallet 100, the pallet 100 slides downwardly toward the diverter 30. It is preferred that a braking mechanism be used to control the descent of the pallet 100 from the mechanism 20 to the diverter 30. In a preferred embodiment, this braking mechanism is a conveyor belt (not shown) positioned just beneath the pallet between the rails of the track 12, and extends from above the stopping mechanism 20 to the lower end 12b of the track 12. This conveyor preferably has a conventional ribbed belt that extends around opposed rollers, one of which is driven by a prime mover, such as an electric motor in a conventional manner. Preferably, the conveyor belt ribs seat against the underside of a pallet as it slides on the track 12 from the lower stopping mechanism 20. The belt is driven to advance the pallet 100 toward the diverter 30, which delivers the pallet to the diverter 30 at a controlled speed. The conveyor is connected to and controlled by the central computer 60.

Figure 6:
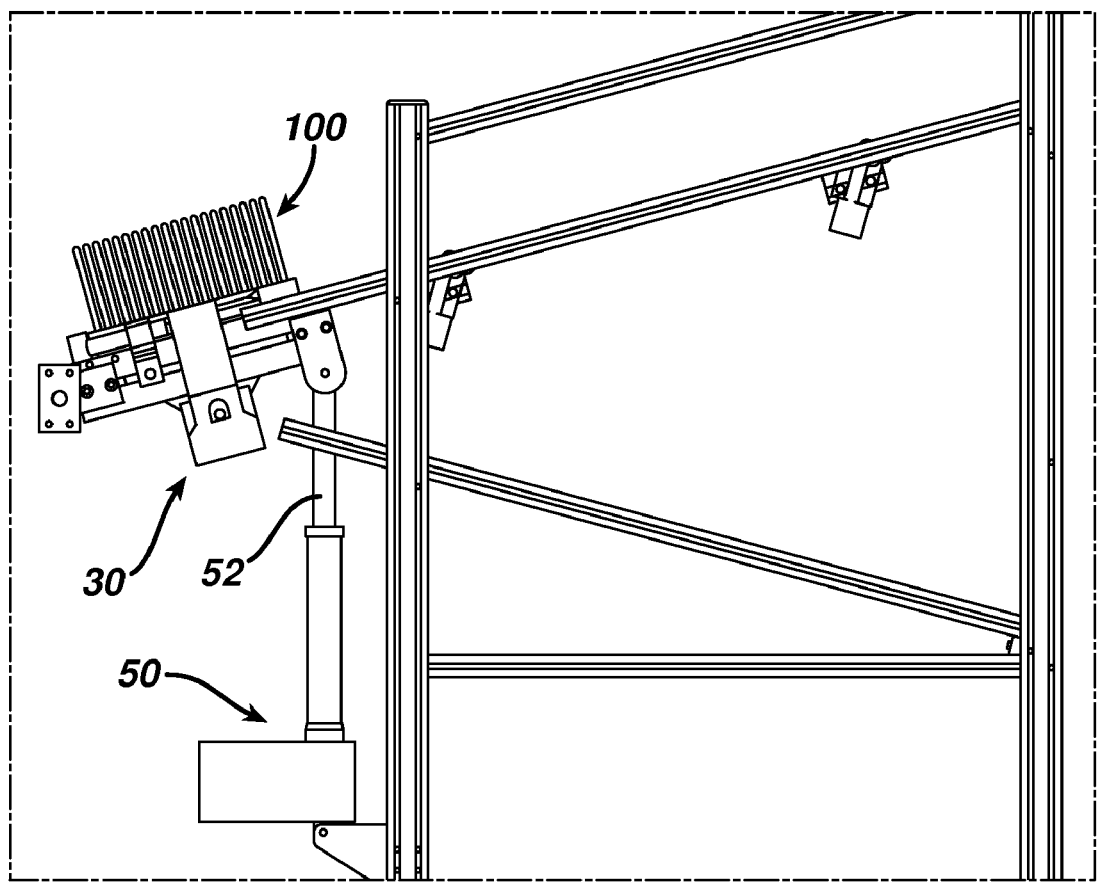
FIG. 6 is a side view illustrating the apparatus of FIG. 1 during a later step of a preferred process.

When the pallet slides into the diverter 30, it is guided and limited in its lateral motion, relative to the desired direction of pallet travel, by the guide rails 37. The stop 34 arrests all longitudinal movement of the pallet 100 along the desired path of travel and causes the pallet to come to a rest. Once the pallet 100 is positioned in the diverter 30 as shown in FIG. 6, the clamping mechanism precisely locates the pallet 100 in the diverter 30 as described above and is actuated by the central computer 60. This precise location also fixes the pallet 100 to the diverter 30 so that the pallet's location does not change substantially, even when the diverter moves.

Figure 7:
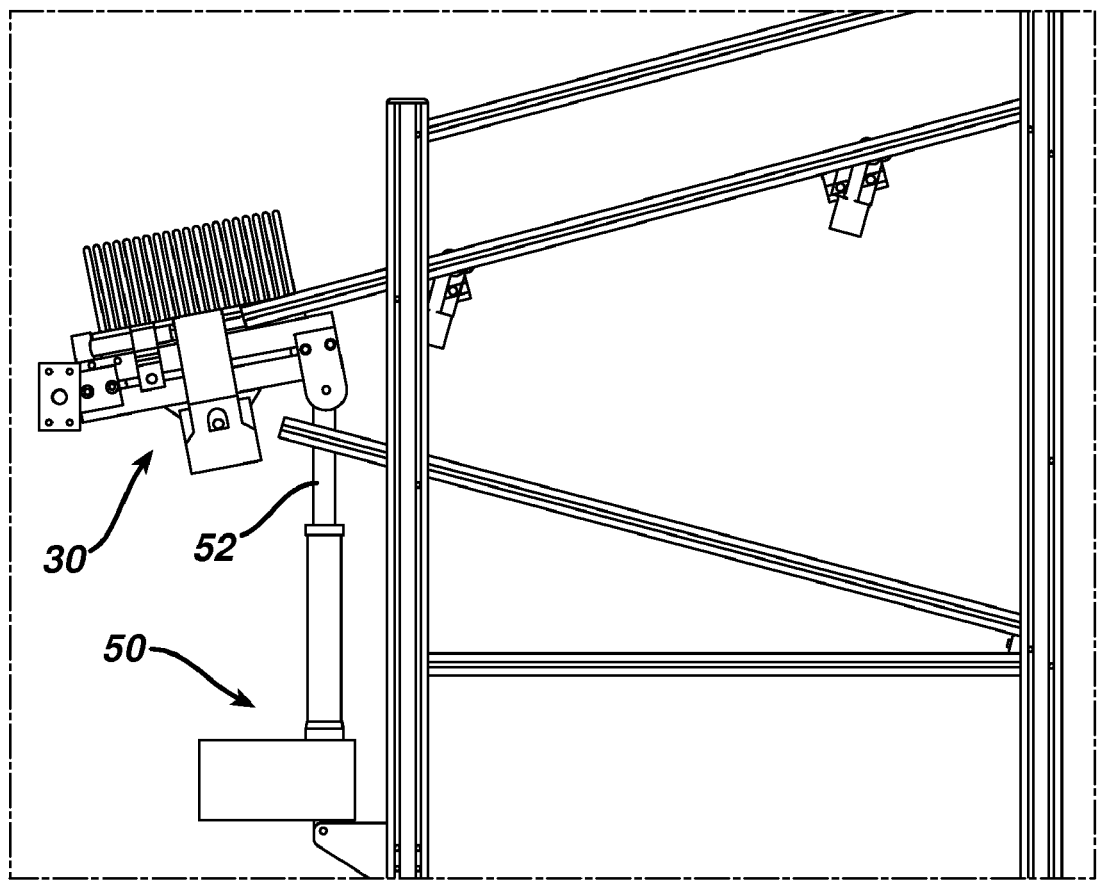
FIG. 7 is a side view illustrating the apparatus of FIG. 1 during a later step of a preferred process.
Figure 8:
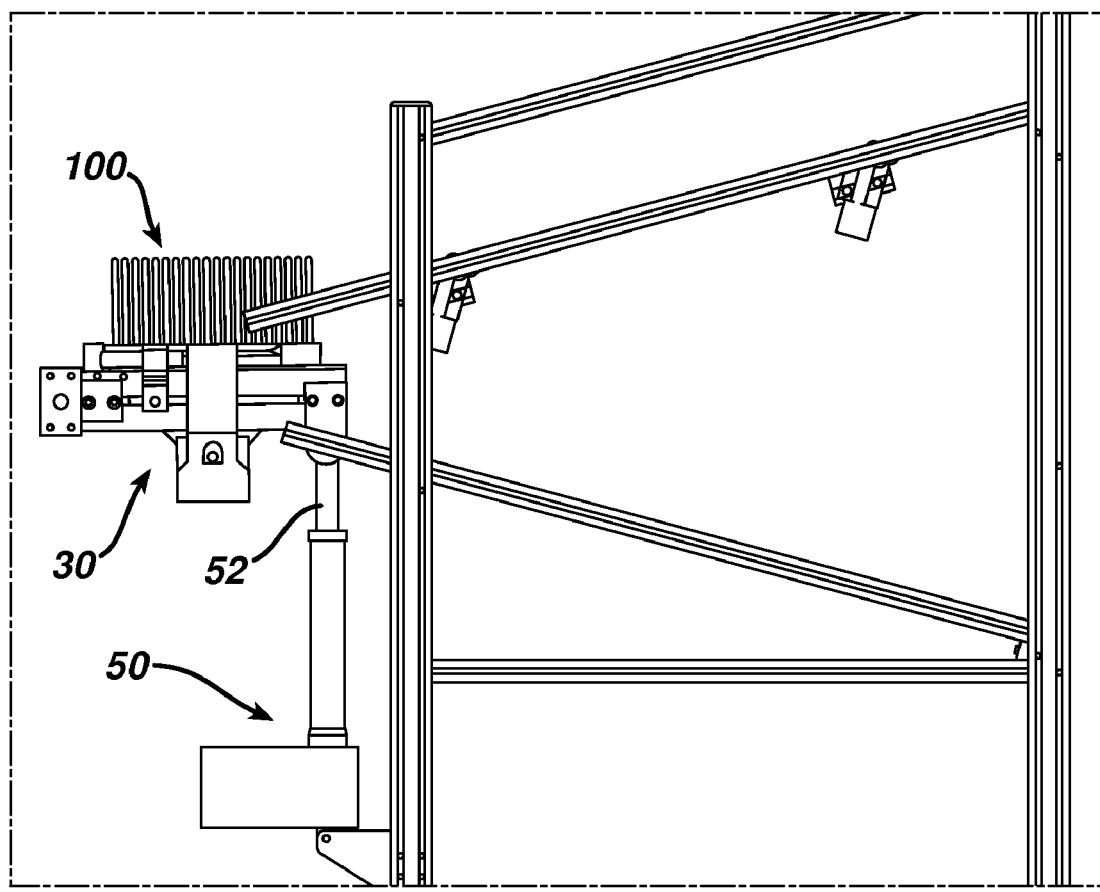
FIG. 8 is a side view illustrating the apparatus of FIG. 1 during a later step of a preferred process.

Once the pallet 100 is fixed in the diverter 30, the jack 50 is actuated by the central computer 60 to lower the rightward end, as shown in FIG. 7, by retracting the rod 52. This lowering proceeds until the diverter 30 orients the parts-holding region of the pallet 100 in a substantially horizontal orientation, which is preferably when the upper surface of the diverter 30 upon which the pallet 100 rests is substantially horizontal, as shown in FIG. 8. The parts-holding region of the pallet 100 is the region upon which component parts are held during use thereof. In the preferred embodiment of the invention, this is the upwardly facing surface of the pallet 100. However, it should be noted that it is possible for a pallet to have a planar upper surface, as in the pallet 100 illustrated, but a separate parts-holding region. This condition permits the upper surface of the pallet to be oriented other than horizontal when the parts-holding region of the pallet 100 is substantially horizontal, and vice versa. It is preferred that both regions be horizontal at the same time, but this is not required. Persons skilled in the art will understand from this description that it is possible to construct pallets that do not conform to the preferred embodiment, but nonetheless detract little from the invention.

Once the parts-holding region of the pallet 100 is substantially horizontal, the diverter apparatus 8 is maintained in substantially this position while component parts are removed from the pallet 100. In a preferred embodiment, all component parts are removed by a robotic arm that is controlled by the central computer 60 in a conventional manner, and the diverter 30 is held in the same position the entire time parts are being removed therefrom. It is contemplated that the diverter 30 can be moved from the substantially horizontal orientation to another orientation and back before the remaining parts are removed. Likewise, it is possible to remove some parts from the pallet 100 when the diverter 30 is at a horizontal orientation, and then remove additional parts from the pallet 100 after moving the pallet 100 to a new position.

Figure 9:
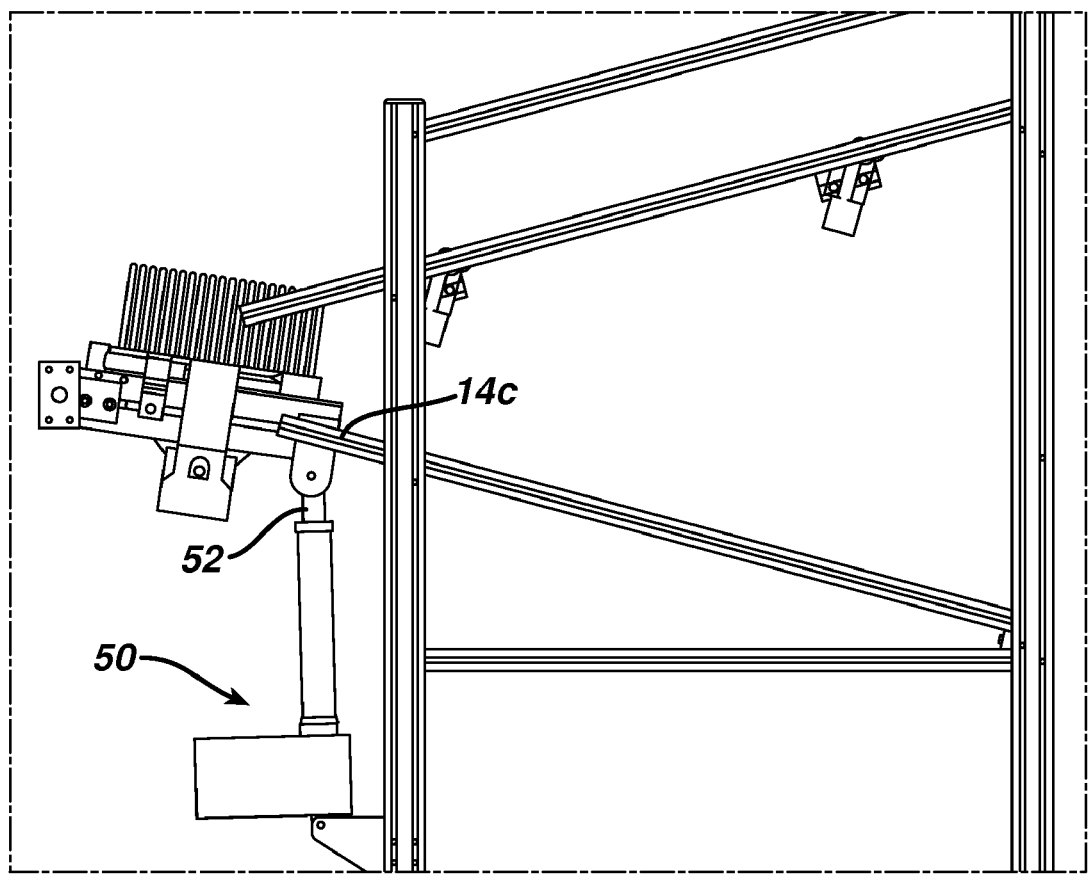
FIG. 9 is a side view illustrating the apparatus of FIG. 1 during a later step of a preferred process.
Figure 10:
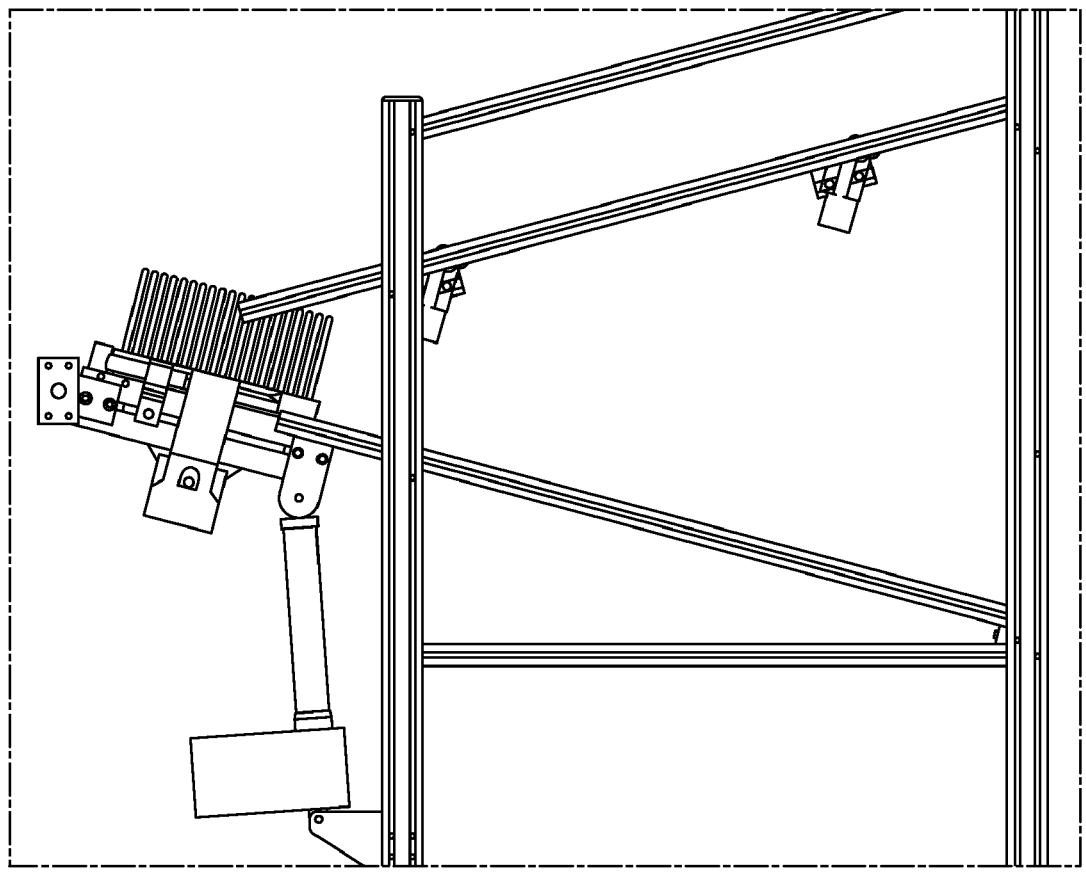
FIG. 10 is a side view illustrating the apparatus of FIG. 1 during a later step of a preferred process.
Figure 11:
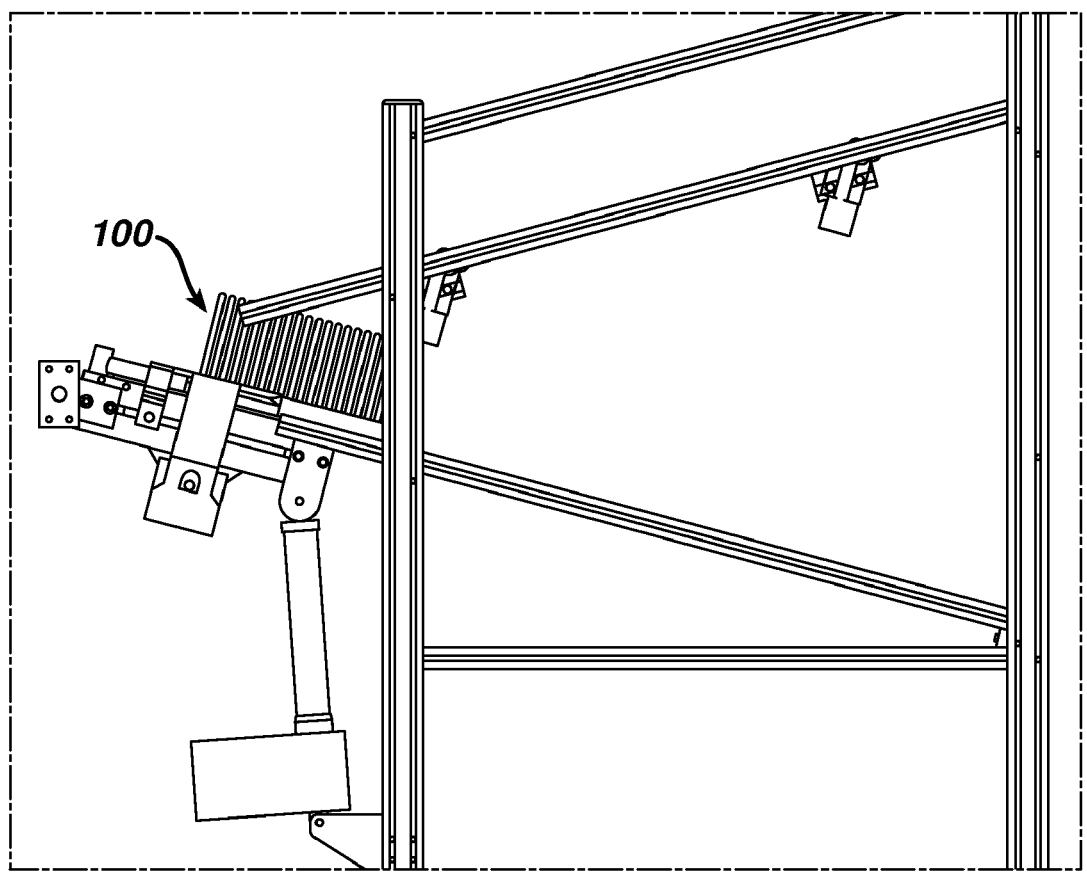
FIG. 11 is a side view illustrating the apparatus of FIG. 1 during a later step of a preferred process.
Figure 12:
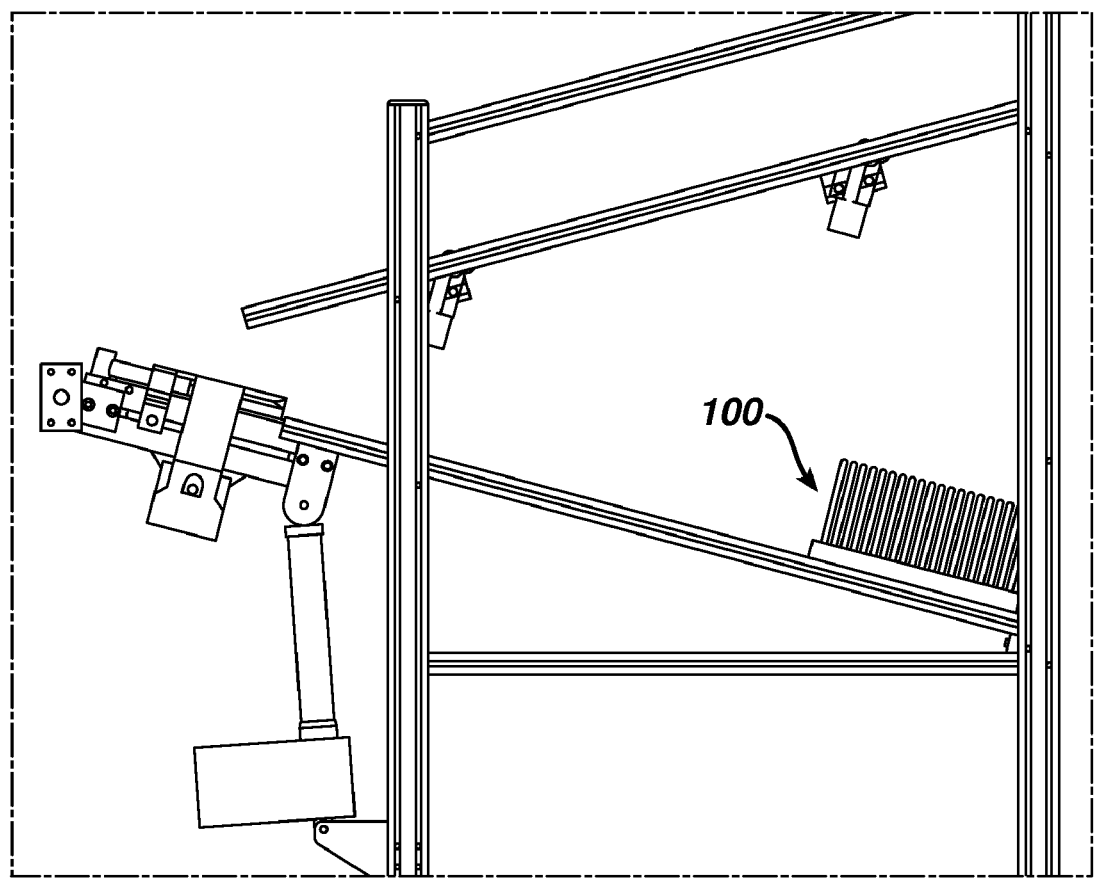
FIG. 12 is a side view illustrating the apparatus of FIG. 1 during a later step of a preferred process.

In the preferred embodiment, once all of the component parts are removed from the pallet 100, as detected by a sensor (not shown and connected to the central computer 60), the jack 50 retracts the rod 52 further, as shown in FIG. 9, and begins to align the diverter 30 with the track end 14c, which is preferably at approximately negative 15° from horizontal. While the diverter 30 is moving the pallet 100, the pallet 100 remains clamped as described above, thereby maintaining the precise location of the pallet 100 in the diverter 30. The diverter 30 lowers the pallet 100 until the channel between the guide rails 37 is aligned along a plane that is parallel to a plane that contains the track 14, as shown in FIG. 10, which is the "giving" orientation. Most preferably, these two planes are substantially coplanar, preventing substantial freefall or other transition that might cause an abrupt change in position of the pallet during the transfer between the diverter 30 and the track 14. Once the clamp releases the pallet 100, the pallet 100 slides downwardly from the diverter 30 onto the upper end 14c of the track 14 as shown in FIG. 11. Because the track 14 is substantially identical material and configuration as the track 12, the pallet 100 slides further downwardly under the force of gravity toward the lower end 14d as shown in FIG. 12. Upon reaching the lower end 14d, the pallet 100 preferably slides onto another conveyor (not shown) that returns the pallet 100 to a loading point for reloading with component parts and a return to the beginning of the process described above.

After the pallet 100 is released by the lower stopping mechanism 20, and before the diverter 30 is raised upwardly by the jack 50 to the receiving orientation, the central computer 60 preferably actuates the higher stopping mechanism 22 to release another pallet to the lower stopping mechanism 20. By doing so, a pallet that is ready to be received in the diverter 30 is maintained very close to the diverter 30 at the time the diverter 30 gives up a pallet to the lower track 14, and the rightward end is pivoted up by the jack 50 to the receiving orientation, as described above. Preferably as soon as the diverter 30 reaches the receiving orientation, the next pallet held by the lower stopping mechanism 20 is released and subsequently received by the diverter 30 as described above. The diverter 30 is then rotated to a horizontal orientation as described above, and the component parts on the pallet are removed by a robotic arm. In this manner the cycle continues.

Although only one pallet is shown and described herein as being placed in a diverter at a time, it is contemplated that a plurality of pallets can be placed in a diverter at any given time. And although it is shown to have a pallet upon which component parts are placed for consumption in the assembly line, it is contemplated for the pallet to be the component part that is consumed in the manufacturing process. This would eliminate the need for a second, lower track, such as the track 14. Furthermore, although a mechanism is shown herein in which a pallet or other component falls by gravity from a higher to a lower position, it is contemplated that the invention would work in an apparatus in which a pallet or component is driven upwardly from a lower to a higher position. For example, the use of conveyor belts instead of the tracks 12 and 14 described above is contemplated. In such an alternative, the mechanism would work essentially in the opposite direction to that described above.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method of moving a pallet with at least one object disposed thereon from a first level to a second level, the method comprising:
   (a) conveying the pallet with said at least one object disposed thereon toward a diverter;
   (b) conveying the pallet onto the diverter while the diverter is disposed at a first angle relative to horizontal;
   (c) moving the diverter from the first angle to a second angle relative to horizontal that is different from the first angle, and moving the pallet with the diverter;
   (d) holding the diverter stationary at the second angle while removing said at least one object from the pallet;
   (e) moving the diverter from the second angle to a third angle relative to horizontal that is different from the second angle, and moving the pallet with the diverter; and
   (f) conveying the pallet away from the diverter while the diverter is disposed at the third angle.

2. The method in accordance with claim 1, further comprising the step of releasably fixing the pallet to the diverter.

3. The method in accordance with claim 2, wherein the step of releasably fixing the pallet to the diverter further comprises clamping the pallet.

4. The method in accordance with claim 2, further comprising the step of releasing the pallet from the diverter.

5. The method in accordance with claim 1, wherein the second angle is substantially equal to horizontal.

6. The method in accordance with claim 1, wherein the step of conveying the pallet toward the diverter further comprises disposing a conveyor belt beneath the pallet and driving the conveyor belt.

7. The method in accordance with claim 5, wherein the step of conveying the pallet away from the diverter further comprises disposing a conveyor track beneath the pallet.

8. A method of moving a pallet with at least one object disposed thereon from a first level vertically to a second level, the method comprising:
   (a) conveying the pallet with the object disposed thereon along a first conveyor track from an upper conveyor track end toward a diverter disposed adjacent a lower conveyor track end;
   (b) conveying the pallet onto the diverter while the diverter is disposed substantially parallel to the first conveyor track;
   (c) releasably fixing the pallet to the diverter;
   (d) pivoting the diverter to a substantially horizontal orientation, thereby moving the pallet to substantially horizontal;
   (e) holding the diverter stationary at the substantially horizontal orientation while removing the object from the pallet;
   (f) pivoting the diverter from the substantially horizontal orientation to substantially parallel to a second conveyor track having an upper conveyor track end adjacent the diverter and a lower conveyor track end spaced from the diverter, thereby moving the pallet with the diverter;
   (g) releasing the pallet from the diverter; and (h) conveying the pallet onto the second conveyor track while the diverter is substantially parallel to the second conveyor track.

9. The method in accordance with claim 8, further comprising the step of stopping the pallet along the first conveyor track and releasing the pallet to be conveyed onto the diverter.

10. The method in accordance with claim 9, further comprising the step of driving the pallet onto the diverter.

11. The method in accordance with claim 9, further comprising the step of positively locating the pallet on the diverter.

* * * * *